United States Patent
Leffert et al.

(10) Patent No.: US 8,621,391 B2
(45) Date of Patent: Dec. 31, 2013

(54) DEVICE, METHOD, AND COMPUTER READABLE MEDIUM FOR MAINTAINING A SELECTION ORDER IN A DISPLAYED THUMBNAIL STACK OF USER INTERFACE ELEMENTS ACTED UPON VIA GESTURED OPERATIONS

(75) Inventors: Akiva Dov Leffert, San Francisco, CA (US); Peter William Rapp, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 523 days.

(21) Appl. No.: 12/639,785

(22) Filed: Dec. 16, 2009

(65) Prior Publication Data

US 2011/0145768 A1    Jun. 16, 2011

(51) Int. Cl.
*G06F 3/048*    (2013.01)

(52) U.S. Cl.
USPC .......................... 715/823; 715/837; 715/838

(58) Field of Classification Search
USPC ......... 715/702, 704, 716, 810, 835, 838–839, 715/863–864, 837, 823; 345/163, 168, 173, 345/179, 473–475
See application file for complete search history.

(56) References Cited

U.S. PATENT DOCUMENTS

| | | | |
|---|---|---|---|
| 5,886,697 A * | 3/1999 | Naughton et al. ............ 345/473 |
| 6,286,104 B1 * | 9/2001 | Buhle et al. ....................... 726/4 |
| 6,323,846 B1 | 11/2001 | Westerman et al. .......... 345/173 |
| 6,570,557 B1 | 5/2003 | Westerman et al. .......... 345/173 |
| 6,677,932 B1 | 1/2004 | Westerman .................... 345/173 |
| 6,888,536 B2 | 5/2005 | Westerman et al. .......... 345/173 |
| 7,086,013 B2 * | 8/2006 | Saund et al. ................... 715/863 |
| 7,178,110 B2 * | 2/2007 | Fujino ............................ 715/838 |
| 7,218,226 B2 | 5/2007 | Wehrenberg ................... 340/571 |
| 7,516,413 B2 * | 4/2009 | Toh et al. ........................ 715/769 |
| 7,614,008 B2 | 11/2009 | Ording ........................... 715/773 |
| 7,633,076 B2 | 12/2009 | Huppi et al. .............. 250/559.36 |
| 7,653,883 B2 | 1/2010 | Hotelling et al. ............. 715/863 |
| 7,657,849 B2 | 2/2010 | Chaudhri et al. ............. 715/863 |
| 7,663,607 B2 | 2/2010 | Hotelling et al. ............. 345/173 |
| 7,688,306 B2 | 3/2010 | Wehrenberg et al. ......... 345/158 |
| 7,694,231 B2 | 4/2010 | Kocienda et al. ............. 715/773 |
| 7,853,888 B1 * | 12/2010 | Dhawan et al. ............... 715/770 |

(Continued)

FOREIGN PATENT DOCUMENTS

WO    WO 2007/121557 A1    11/2007    ................ G06F 3/14

OTHER PUBLICATIONS

Rathbone, Andy "Windows 7 for Dummies", Sep. 8, 2009, Publisher: for Dummies, ISBN: 978-0-470-49743-2, pp. 29-30, 48, 52, 66, 74-75, 7879, 82-85, 130, & 298-299.*

(Continued)

*Primary Examiner* — Doon Chow
*Assistant Examiner* — Wilson Varga
(74) *Attorney, Agent, or Firm* — Flecther Yoder PC

(57) ABSTRACT

Computing devices and methods for managing user interface content and user interface elements are disclosed. In one embodiment, after a plurality of user interface elements is selected from an ordered list, wherein a selection order is maintained for the selected plurality of user interface elements: a user gesture to perform an operation on the plurality of user interface elements is detected, and in response, a stack of temporarily displayed thumbnails corresponding to the selected plurality of user interface elements is displayed, wherein a display order of the stack of temporarily displayed thumbnails corresponds to the selection order of the selected plurality of user interface elements.

10 Claims, 18 Drawing Sheets

(56) References Cited

U.S. PATENT DOCUMENTS

| | | | |
|---|---|---|---|
| 7,865,845 B2* | 1/2011 | Dettinger et al. | 715/863 |
| 8,269,736 B2* | 9/2012 | Wilairat | 345/173 |
| 2002/0140740 A1* | 10/2002 | Chen | 345/810 |
| 2005/0283742 A1 | 12/2005 | Gusmorino et al. | 715/839 |
| 2006/0033724 A1 | 2/2006 | Chaudhri et al. | 345/173 |
| 2006/0036568 A1* | 2/2006 | Moore et al. | 707/1 |
| 2006/0085757 A1 | 4/2006 | Andre et al. | 715/771 |
| 2006/0161870 A1 | 7/2006 | Hotelling et al. | 715/863 |
| 2006/0197753 A1 | 9/2006 | Hotelling | 345/173 |
| 2007/0126732 A1 | 6/2007 | Robertson et al. | 345/419 |
| 2007/0152980 A1 | 7/2007 | Kocienda et al. | 345/173 |
| 2007/0257890 A1 | 11/2007 | Hotelling et al. | 345/173 |
| 2007/0279419 A1* | 12/2007 | Seebach | 345/473 |
| 2008/0120571 A1 | 5/2008 | Chang et al. | 715/810 |
| 2008/0140868 A1 | 6/2008 | Kalayjian et al. | 710/8 |
| 2008/0167834 A1 | 7/2008 | Herz et al. | 702/150 |
| 2008/0320391 A1 | 12/2008 | Lemay et al. | 715/702 |
| 2009/0307623 A1* | 12/2009 | Agarawala et al. | 715/765 |
| 2009/0327975 A1* | 12/2009 | Stedman | 715/863 |
| 2010/0125787 A1* | 5/2010 | Chihara et al. | 715/702 |

OTHER PUBLICATIONS

Stackoverflow, "User interface for reordering a list items", Feb. 13, 2009, retrieved from the internet at stackoverflow.com/questions/546375 on Apr. 6, 2013, 5 pgs.*

* cited by examiner (A)

↓

- Detect a second portion of the user-initiated operation on the selected user interface elements; in response to detecting the second portion of the user-initiated operation on the selected user interface elements: update the display of the stack of temporarily displayed thumbnails in accordance with the second portion of the user-initiated operation; and, perform the user-initiated operation on the selected user interface elements. — 620
  - After performing the user-initiated operation on the selected user interface elements, terminate display of the stack of temporarily displayed thumbnails. — 622
  - The user gesture corresponding to the user-initiated operation is detected on a touch screen display; the first portion of the user gesture corresponding to the user-initiated operation is detected as a first user input; the second portion of the user gesture corresponding to the user-initiated operation is detected as a second user input; the second portion of the user gesture is detected while continuing to detect the first user input; and, the first and second user inputs are detected at different locations on the touch screen display. — 624
  - The selected user interface elements from the ordered list have respective pre-selection locations on the display, and further comprising: in response to detecting the second portion of the user gesture, displaying residual images of the selected user interface elements at respective pre-selection locations of the selected user interface elements. — 626

Figure 6B

DEVICE, METHOD, AND COMPUTER READABLE MEDIUM FOR MAINTAINING A SELECTION ORDER IN A DISPLAYED THUMBNAIL STACK OF USER INTERFACE ELEMENTS ACTED UPON VIA GESTURED OPERATIONS

TECHNICAL FIELD

The disclosed embodiments relate generally to electronic computing devices, and more particularly, to computing devices for managing user interface content and user interface elements.

BACKGROUND

The use of computers and other electronic computing devices to manage user interface content and user interface elements has increased significantly in recent years. Exemplary computing devices that include capabilities of managing user interface content and user interface elements include mobile telephones, desktop computers, laptop computers, tablet computers, electronic book readers, consumer electronics, personal digital assistants, etc.

Many users rely on electronic computing devices for managing user interface content and user interface elements. Unfortunately, existing methods for managing user interface content and user interface elements are cumbersome and inefficient. In addition, existing methods take longer than necessary, thereby wasting energy. This latter consideration is particularly important in battery-operated devices.

Accordingly, there is a need for computing devices with faster, more efficient methods and interfaces for managing user interface content and user interface elements, such as displaying temporarily displayed thumbnail representative images of user interface elements during user operations on those user interface elements. Such methods and interfaces may complement or replace conventional methods for managing user interface content and user interface elements. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital video recording, web browsing, digital music playing, and/or digital video playing. Executable instructions for performing these functions may be included in a computer readable storage medium or other computer program product configured for execution by one or more processors.

In accordance with some embodiments, a method is performed at a computing device with a display and one or more user input devices. The method includes: at a computing device with a display and one or more user input devices adapted to detect user gestures: displaying on the display a plurality of user interface elements in an ordered list; detecting one or more user interface element selection gestures, the detected user-interface element selection gestures corresponding to the selection of two or more user interface elements in the plurality of user interface elements in the ordered list; while detecting the one or more user interface element selection gestures, maintaining a selection order for the selected user interface elements; after detecting the one or more user interface element selection gestures, detecting a user gesture, the detected user gesture corresponding to a first portion of a user-initiated operation on the selected user interface elements; in response to detecting the user gesture corresponding to the first portion of the user-initiated operation, displaying a stack of temporarily displayed thumbnails corresponding to the selected user interface elements, wherein a stacked display order of the stack of temporarily displayed thumbnails corresponds to the selection order for the selected user interface elements.

In accordance with some embodiments, a computing device includes a display, one or more user input devices, one or more processors, memory, and one or more programs. The one or more programs are stored in the memory and configured to be executed by the one or more processors. The one or more programs include instructions for: at the computing device, displaying on the display a plurality of user interface elements in an ordered list; detecting one or more user interface element selection gestures, the detected user-interface element selection gestures corresponding to the selection of two or more user interface elements in the plurality of user interface elements in the ordered list; while detecting the one or more user interface element selection gestures, maintaining a selection order for the selected user interface elements; after detecting the one or more user interface element selection gestures, detecting a user gesture, the detected user gesture corresponding to a first portion of a user-initiated operation on the selected user interface elements; in response to detecting the user gesture corresponding to the first portion of the user-initiated operation, displaying a stack of temporarily displayed thumbnails corresponding to the selected user interface elements, wherein a stacked display order of the stack of temporarily displayed thumbnails corresponds to the selection order for the selected user interface elements.

In accordance with some embodiments there is a graphical user interface on a computing device with a display, one or more user input devices, a memory, and one or more processors to execute one or more programs stored in the memory. The graphical user interface includes a plurality of user interface elements in an ordered list, wherein the ordered list is displayed on the display of the computing device; wherein: one or more user interface element selection gestures are detected, the detected user-interface element selection gestures corresponding to the selection of two or more user interface elements in the plurality of user interface elements in the ordered list; while detecting the one or more user interface element selection gestures, a selection order for the selected user interface elements is maintained; after detecting the one or more user interface element selection gestures, a user gesture is detected, the detected user gesture corresponding to a first portion of a user-initiated operation on the selected user interface elements; in response to detecting the user gesture corresponding to the first portion of the user-initiated operation, a stack of temporarily displayed thumbnails corresponding to the selected user interface elements is displayed, wherein a stacked display order of the stack of temporarily displayed thumbnails corresponds to the selection order for the selected user interface elements.

In accordance with some embodiments, a computer readable storage medium has stored therein one or more programs, the one or more programs comprising instructions, which when executed by a computing device with a display and one or more user input devices, cause the computing device to: display on the display a plurality of user interface elements in an ordered list; detect one or more user interface element selection gestures, the detected user-interface element selection gestures corresponding to the selection of two or more user interface elements in the plurality of user interface elements in the ordered list; while detecting the one or more user interface element selection gestures, maintain a selection order for the selected user interface elements; after detecting the one or more user interface element selection gestures, detect a user gesture, the detected user gesture corresponding to a first portion of a user-initiated operation on the selected user interface elements; in response to detecting the user gesture corresponding to the first portion of the user-initiated operation, display a stack of temporarily displayed thumbnails corresponding to the selected user interface elements, wherein a stacked display order of the stack of temporarily displayed thumbnails corresponds to the selection order for the selected user interface elements.

In accordance with some embodiments, a computing device includes a display; one or more user input devices; and means for displaying on the display a plurality of user interface elements in an ordered list, and while displaying on the display the plurality of user interface elements: means for detecting one or more user interface element selection gestures, the detected user-interface element selection gestures corresponding to the selection of two or more user interface elements in the plurality of user interface elements in the ordered list; while detecting the one or more user interface element selection gestures, means for maintaining a selection order for the selected user interface elements; after detecting the one or more user interface element selection gestures, means for detecting a user gesture, the detected user gesture corresponding to a first portion of a user-initiated operation on the selected user interface elements; in response to detecting the user gesture corresponding to the first portion of the user-initiated operation, means for displaying a stack of temporarily displayed thumbnails corresponding to the selected user interface elements, wherein a stacked display order of the stack of temporarily displayed thumbnails corresponds to the selection order for the selected user interface elements.

In accordance with some embodiments, an information processing apparatus for use in a computing device includes a display, one or more user input devices, and means for displaying on the display a plurality of user interface elements in an ordered list, and while displaying on the display the plurality of user interface elements: means for detecting one or more user interface element selection gestures, the detected user-interface element selection gestures corresponding to the selection of two or more user interface elements in the plurality of user interface elements in the ordered list; while detecting the one or more user interface element selection gestures, means for maintaining a selection order for the selected user interface elements; after detecting the one or more user interface element selection gestures, means for detecting a user gesture, the detected user gesture corresponding to a first portion of a user-initiated operation on the selected user interface elements; in response to detecting the user gesture corresponding to the first portion of the user-initiated operation, means for displaying a stack of temporarily displayed thumbnails corresponding to the selected user interface elements, wherein a stacked display order of the stack of temporarily displayed thumbnails corresponds to the selection order for the selected user interface elements.

Thus, computing devices are provided with faster, more efficient methods and interfaces for managing user interface content and user interface elements, thereby increasing the effectiveness, efficiency, and user satisfaction with such devices. Such methods and interfaces may complement and/or replace conventional methods for managing user interface content and user interface elements.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6B are flow diagrams illustrating a method of managing user interface content and user interface elements in accordance with some embodiments.

DESCRIPTION OF EMBODIMENTS

Figure 1A:
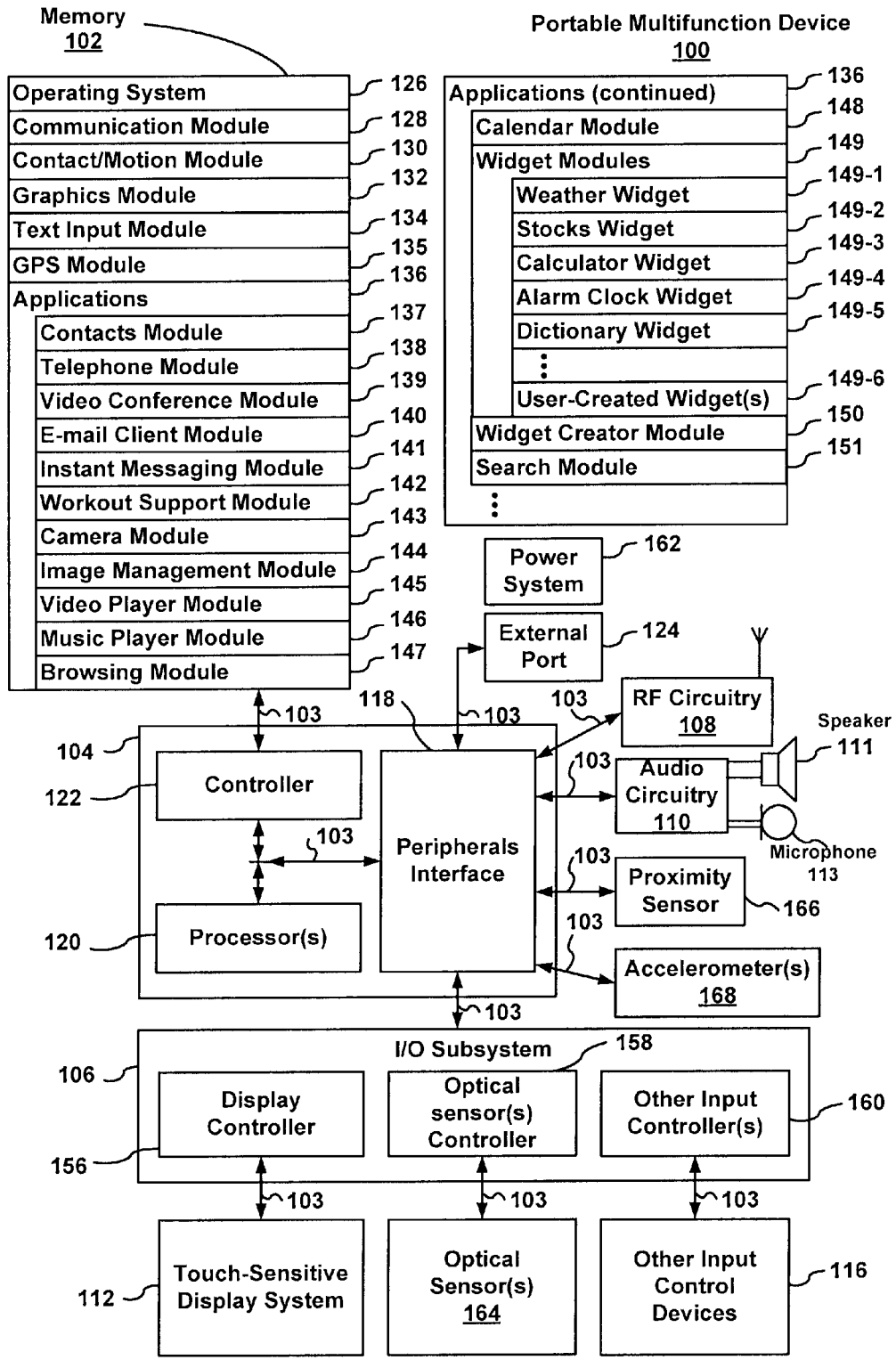
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
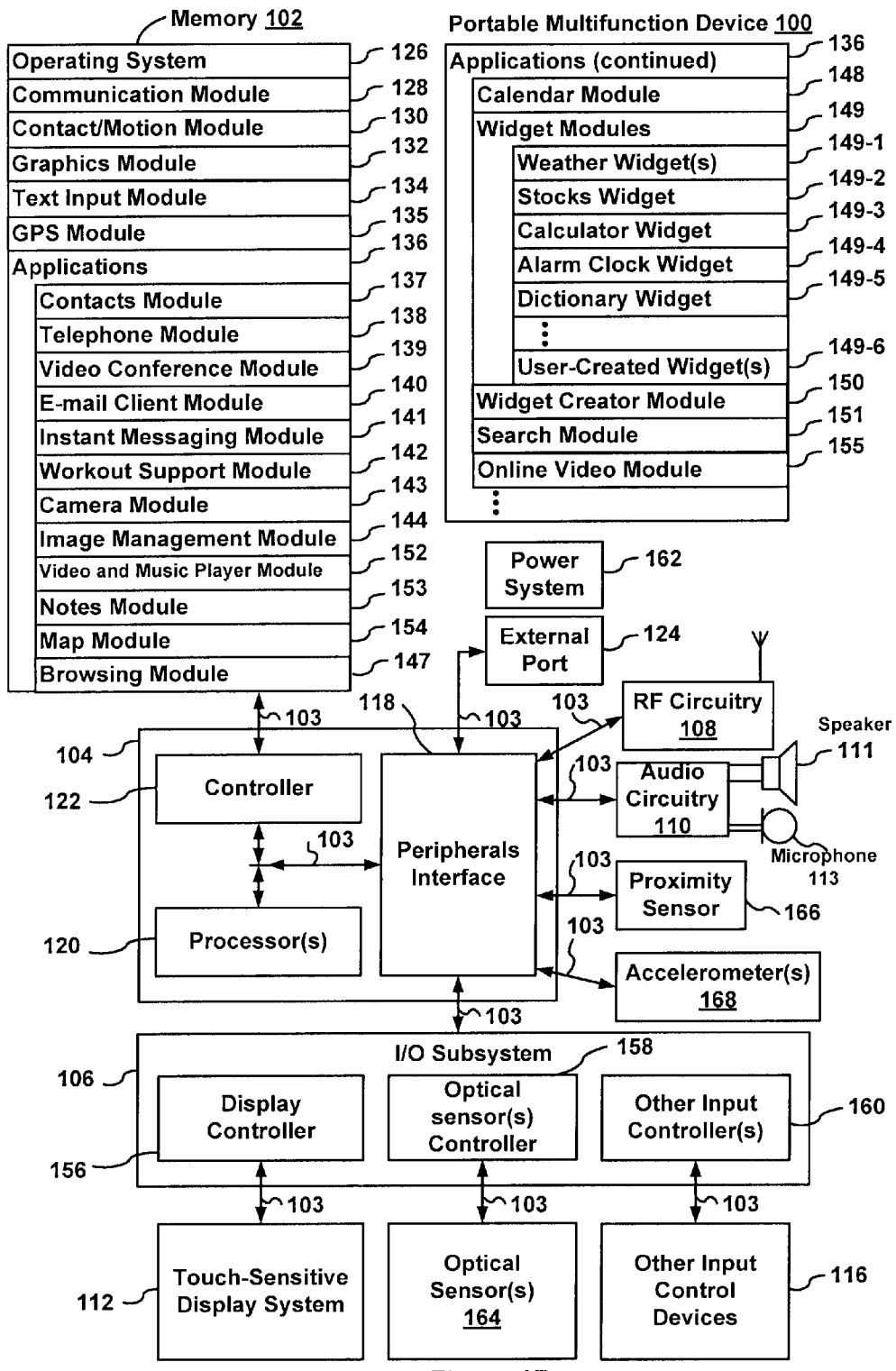

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple, Inc. of Cupertino, Calif.

A touch-sensitive display in some embodiments of the touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include a charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968, 067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
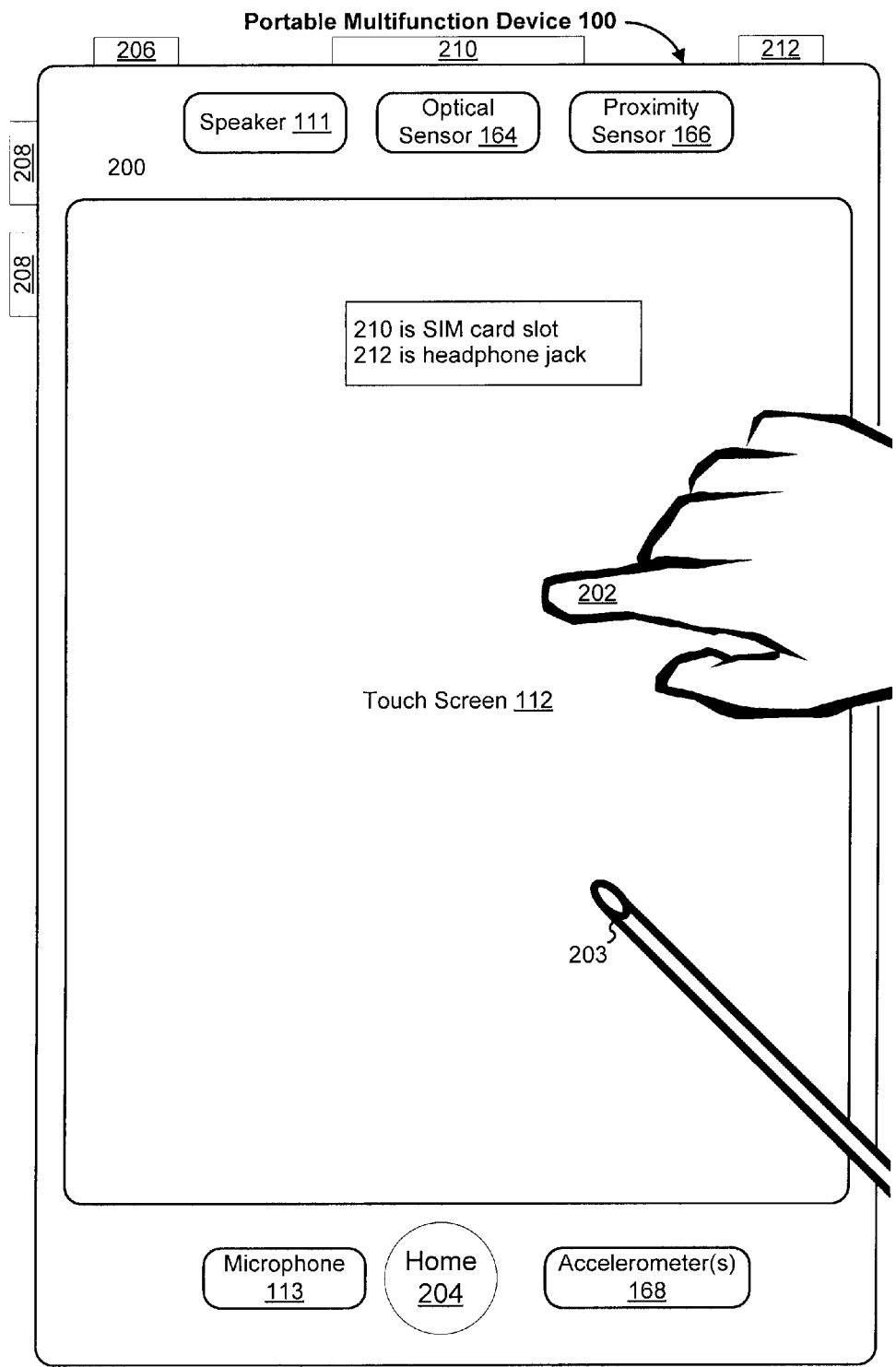
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

Figure 3:
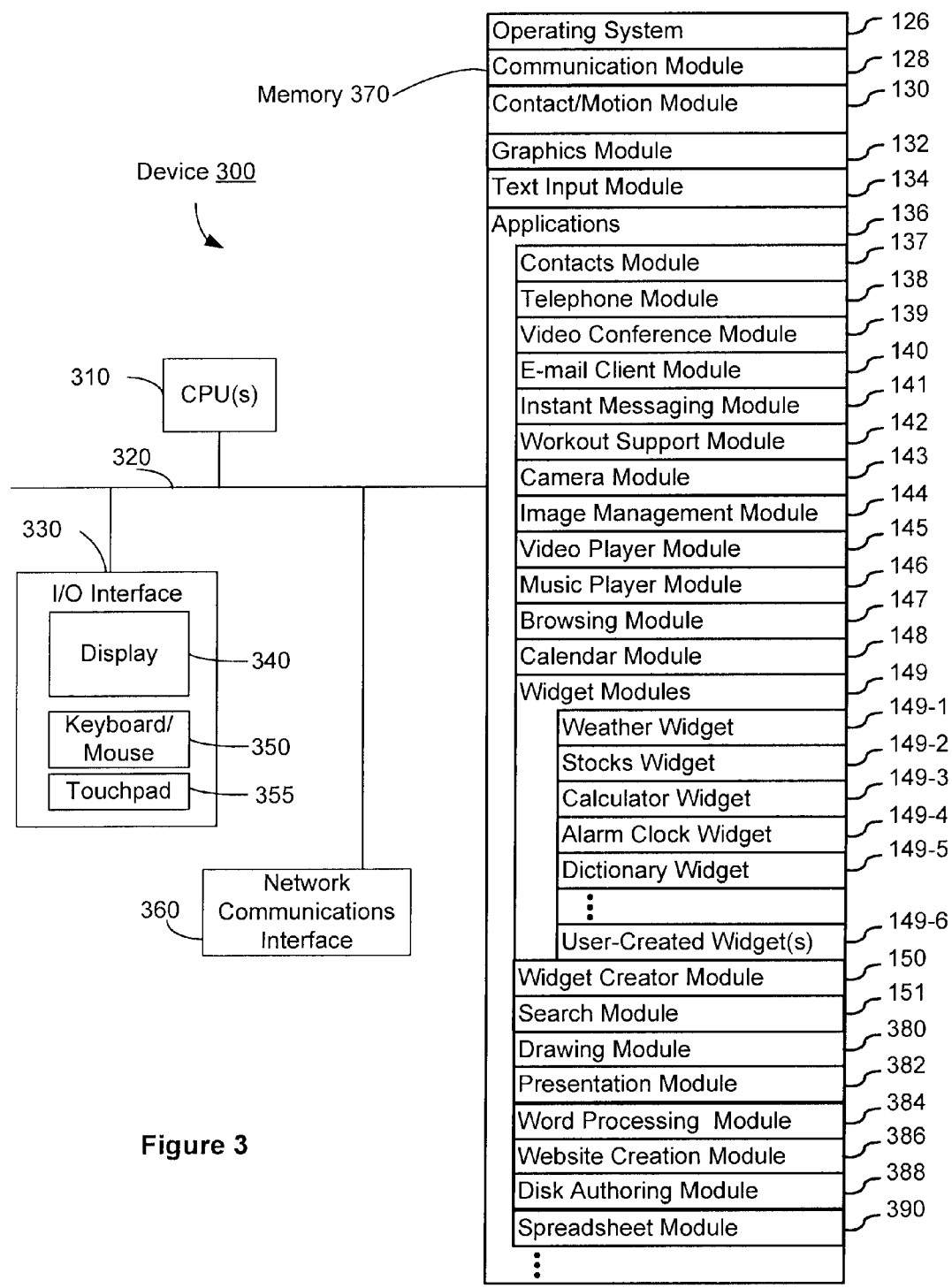
FIG. 3 is a block diagram of an exemplary multifunction device with a display and a touch-sensitive surface in accordance with some embodiments.

The device 100 may also include one or more physical buttons, such as "home" or menu button 204. As described previously, the menu button 204 may be used to navigate to any application 136 in a set of applications that may be executed on the device 100 (e.g., applications as illustrated in FIGS. 1A, 1B and 3). Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes a user interface 330 comprising a display 340, which is typically a touch screen display. The user interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
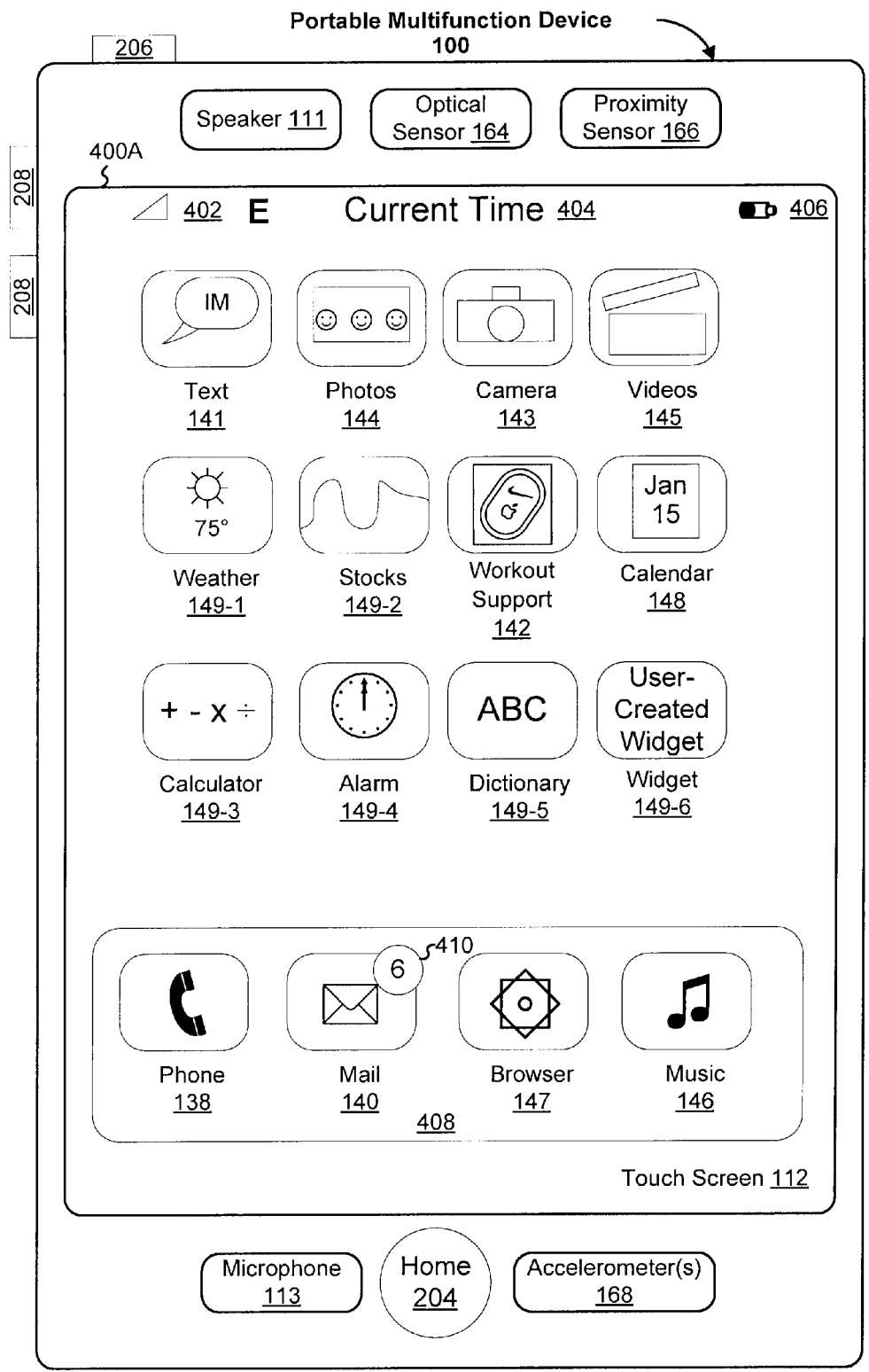
FIGS. 4A and 4B illustrate exemplary user interfaces for a menu of applications on a portable multifunction device in accordance with some embodiments.
Figure 4B:
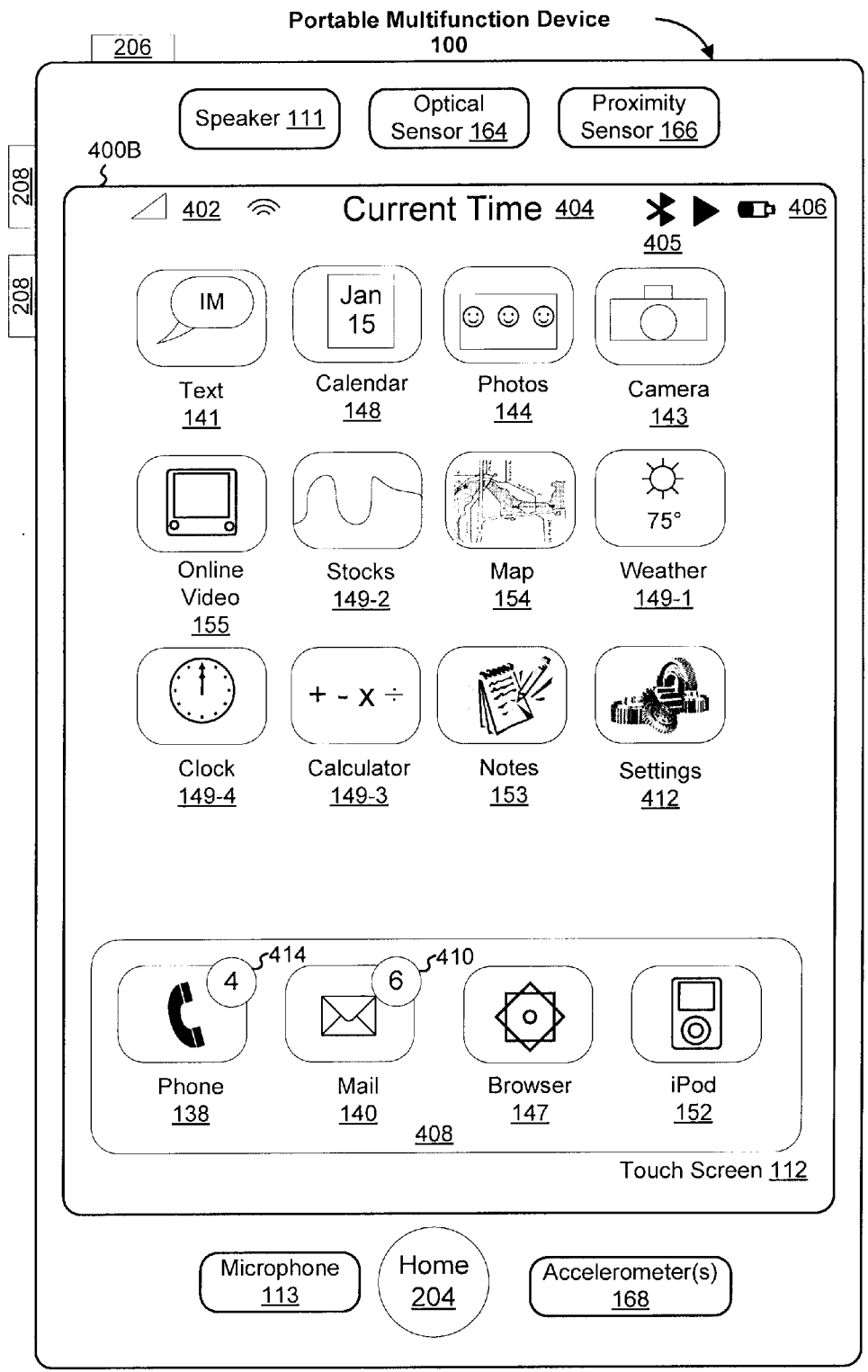

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below;
  Video and music player module 152, also referred to as iPod (trademark of Apple, Inc.) module 152; and
  Online video module 155, also referred to as YouTube (trademark of Google, Inc.) module 155.

Figure 4C:
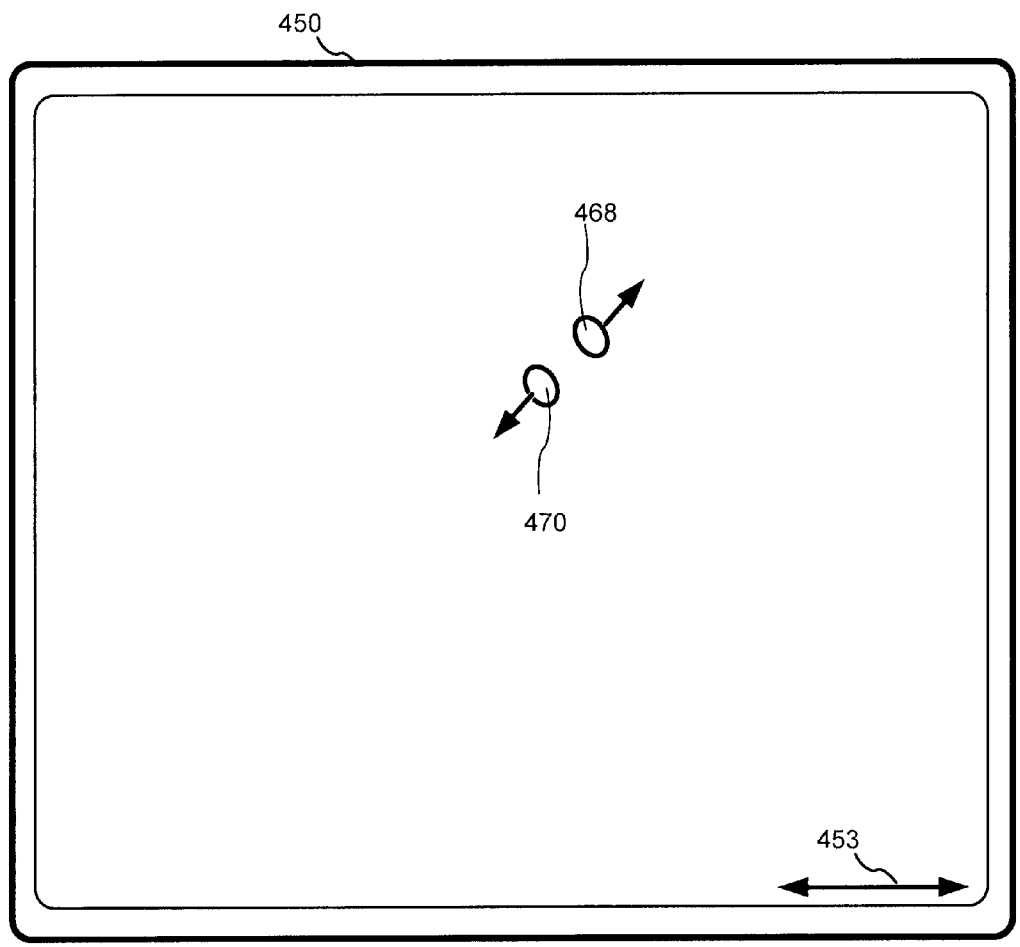
FIG. 4C illustrates an exemplary user interface for a multifunction device with a touch-sensitive surface that is separate from the display in accordance with some embodiments.
Figure 4C:
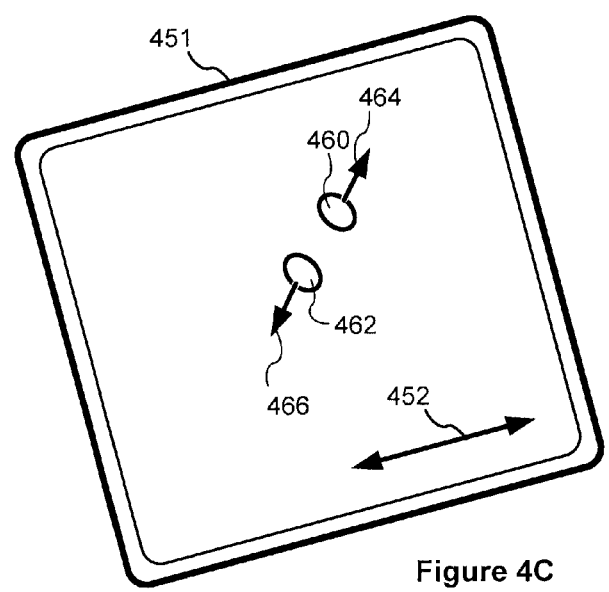

FIG. 4C illustrates an exemplary user interface on a multifunction device with a separate display (e.g., 450) and touch-sensitive surface (e.g., 451). Although many of the examples which follow will be given with reference to a touch screen display (e.g., where the touch sensitive surface and the display are combined, as shown in device 100 in FIGS. 4A-4B), in some embodiments the display and the touch-sensitive surface are separate, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462 in the directions 464 and 466, respectively) detected by the device on the touch-sensitive surface (e.g., 451 in FIG. 4C) are used by the device to manipulate the user interface on the display (e.g., 450 in FIG. 4C) of the multifunction device when the touch-sensitive surface and the display are separate. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5I illustrate exemplary user interfaces for managing user interface content and user interface elements in accordance with some embodiments. The user interfaces in these figures are used to illustrate the processes described below, including the processes in FIGS. 6A-6B.

UI 500A (FIG. 5A) illustrates an exemplary user interface on a computing device, here portable multifunction device 100 with touch screen 112. An ordered list 500 is depicted, including a plurality of user interface elements object 1 500-1, object 2 500-2, object 3 500-3, object 4 500-4, and object 5 500-5. Though not depicted in UI 500A, ordered list 500 also includes user interface elements object 6 500-6, object 7 500-7, object 8 500-8, object 9 500-9, and object 10 500-10.

Object 1 500-1 is currently selected in the user interface, as is indicated by the bold highlighting surrounding object 1 500-1. UI 500A also illustrates the display of a working copy 505-1 of object 1 500-1.

UI 500A also illustrates exemplary user interface element operations 510, including cut operation 510-1, copy operation 510-2, paste operation 510-3, trash or deletion operation 510-4, and user interface element template operation 510-5.

Exemplary user interface element operations 510 can be used to perform operations on one or more user interface elements by selecting at least one user interface element, and after selecting the at least one user interface element, activating a desired user interface operation. For example, in some embodiments, selecting object 3 500-3 and activating the user interface element template operation 510-5 will enable a user to adjust formatting information associated with a template for object 3 500-3 (not depicted). Exemplary user interface element operations 510 can also be used to perform operations on one or more user interface elements by selecting at least one user interface element, and after selecting the at least one user interface element, dragging the at least one selected user interface element to a location corresponding to the desired user interface element operations 510. For example, in some embodiments, selecting and then dragging object 3 500-3 and object 5 500-5 to user interface element trash operation 510-4 will remove object 3 500-3 and object 5 500-5 from ordered list 500 (not depicted).

UI 500A also illustrates user interface element selection gestures 512-1 and 512-2, on object 2 500-2 and object 500-4, respectively.

UI 500B (FIG. 5B) illustrates that in response to detecting user interface element selection gestures 512-1 and 512-2, object 2 500-2 and object 500-4, respectively, are selected. Accordingly, UI 500B depicts that user interface elements object 500-1, object 500-2, and object 500-4 are currently selected.

UI 500B also illustrates an exemplary user gesture 514, which is initiated at a location corresponding to at least one of selected user interface elements object 1 500-1, object 2 500-2, and object 4 500-4, i.e., the user gesture 514 is started at a location corresponding to objects 500-2 and object 500-4.

UI 500C (FIG. 5C) depicts that in response to detecting user gesture 514 in UI 500B, stack of temporarily displayed thumbnails 516, is displayed. Stack of temporarily displayed thumbnails 516 corresponds to the selected user interface elements, viz., object 1 500-1, object 2 500-2, and object 4 500-4. Note that in this exemplary embodiment, user gesture 514 corresponds to a user-initiated operation, specifically, cutting the selected user interface elements object 1 500-1, object 2 500-2, and object 4 500-4 from ordered list 500 by dragging the stack of temporarily displayed thumbnails to the cut operation 510-1.

More specifically, in the exemplary embodiment of UI 500C, user gesture 514 has a first portion 514-1 and a second portion 514-2. In this example, UI 500C depicts that stack of temporarily displayed thumbnails 516 is displayed in response to detecting the first portion 514-1 of the user-initiated operation to cut the selected user interface elements from the order list 500.

Additionally, UI 500C illustrates that, in some embodiments, the stack of temporarily displayed thumbnails 516 includes a first temporarily displayed thumbnail 516-1 that depicts an image corresponding to a respective selected user interface element, e.g., here, first temporarily displayed thumbnail 516-1 depicts an image that corresponds to selected user interface element object 500-1.

Further, UI 500C illustrates that, in some embodiments, selected user interface elements, i.e., object 1 500-1, object 2 500-2, and object 4 500-4 in this example, are displayed as residual images object 1 500-1r, object 2 500-2r, and object 4 500-4r at their respective pre-selection locations on the display.

UI 500D (FIG. 5D) illustrates that in response to detecting user gesture 514, the display of the stack of temporarily displayed thumbnails 516 is updated. In this example, in accordance with the second portion of the user-initiated operation (illustrated as second portion 514-2 in UI 500C), stack of temporarily displayed thumbnails 516 is moved in accordance with second portion 514-2 of user gesture 514. Specifically, user gesture 514 is a dragging gesture on touch screen 112, which corresponds to a gesture to move the stack of temporarily displayed thumbnails 516 to cut operation 510-1.

UI 500E (FIG. 5E) illustrates that the user-initiated operation is performed on the selected user interface elements. Specifically, in this example, object 1 500-1, object 2 500-2, and object 4 500-4 have been cut from ordered list 500 because user gesture 514 moved stack of temporarily displayed thumbnails 516 to cut operation 510-1.

Accordingly, in UI 500E, ordered list 500 is adjusted to include object 3 500-3, object 5 500-5, object 6 500-6, object 7 500-7, object 8 500-8, object 9 500-9 (not depicted), and object 10 500-10 (not depicted). Object 3 500-3 is currently selected in the user interface, as is indicated by the bold highlighting surrounding object 3 500-3. UI 500E also illustrates the display of a working copy 505-3 of object 3 500-3.

UI 500E also depicts user interface element selection gesture 516 on object 8 500-8.

In the exemplary user interfaces of UI 500F-UI 500I (FIGS. 5F-5I), bimanual user-input gestures are used to initiate an operation on selected user interface elements. Bimanual user-input gestures can be performed by two points of contact simultaneously detected on a touch-sensitive surface to manipulate user interface objects, e.g., the first portion of the user input gesture corresponding to a user-initiated operation is detected as a point of contact on a touch-sensitive surface; the second portion of the user input gesture corresponding to the user-initiated operation is detected as a point of contact on the touch-sensitive surface; the second portion of the user input gesture is detected while continuing to detect the first portion of the user input gesture; and, the first and second user inputs are detected at different locations on the touch-sensitive surface.

UI 500F (FIG. 5F) illustrates that, in response to user interface element selection gesture 516, both object 3 500-3 and object 8 500-8 are currently selected. UI 500F also illustrates user gesture 518, which has a first portion 518-1 that corresponds to the beginning of a user-initiated operation on currently selected object 3 500-3 and object 8 500-8.

UI 500G (FIG. 5G) depicts that in response to detecting first portion 518-1 of user gesture 518 in UI 500F, stack of temporarily displayed thumbnails 520 is displayed. Stack of temporarily displayed thumbnails 520 corresponds to the selected user interface elements, i.e., object 3 500-3 and object 8 500-8.

Note that in this exemplary embodiment, first portion 518-1 of user gesture 518 corresponds to the initiation of a user-initiated operation. Second portion 518-2 of user gesture 518 corresponds to an input to specify what user-initiated operation is to be performed. In the example depicted in UI 500G, second portion 518-2 of user gesture 518 is initiated at the location of cut operation 510-1. Accordingly, operation indicia 522-1 is displayed in conjunction with stack of temporarily displayed thumbnails 520, where operation indicia 522-1 corresponds to a current selection of a user-initiated operation, i.e., the image displayed as operation indicia 522-1 corresponds to the cut operation 510-1.

Note that in UI 500G, second portion 518-2 of user gesture 518 is depicted as traveling over operations copy 510-2 and paste 510-3, and then ending in a location corresponding to operation trash 510-4. In some embodiments, as a user-initiated operation gesture is detected over respective user operation icons, respective operational indicia are displayed in conjunction with the stack of temporarily displayed thumbnails.

UI 500G also illustrates that selected user interface elements, i.e., object 3 500-3 and object 8 500-8 in this example, are displayed as residual images object 500-3r and object 500-8r at their respective pre-selection locations on the display.

UI 500H (FIG. 5H) illustrates that after second portion 518-2 of user gesture 518 stopped at a location corresponding to operation trash 510-4, operation indicia 522-2 is displayed in conjunction with stack of temporarily displayed thumbnails 520, where operation indicia 522-2 corresponds to a current selection of a user-initiated operation, i.e., the image displayed as operation indicia 522-2 corresponds to the trash operation 510-4.

Specifically, in this example, the user gesture 518 corresponding to the user-initiated operation is detected on a touch screen 112; the first portion 518-1 of the user gesture 518 corresponding to the user-initiated operation is detected as a first user input; the second portion 518-2 of the user gesture corresponding to the user-initiated operation is detected as a second user input; the second portion of the user gesture 518 is detected while continuing to detect the first user input; and, the first and second user inputs are detected at different locations on touch screen 112.

Though it is not specifically depicted in UI 500H, user gesture 518, including first portion 518-1 and second portion 518-2, is terminated after second portion 518-2 is at a location corresponding to the trash operation 510-4.

UI 500I (FIG. 5I) illustrates that the user-initiated operation is performed on the selected user interface elements. Specifically, in this example, object 3 500-3 and object 8 500-8 have been removed from ordered list 500 because user gesture 518 is terminated when second portion 518-2 of user gesture 518 is at the location corresponding to trash operation 510-4.

Accordingly, in UI 500I, ordered list 500 is adjusted to include object 5 500-5, object 6 500-6, object 7 500-7, object 9 500-9, and object 10 500-10. Object 5 500-5 is currently selected in the user interface, as is indicated by the bold highlighting surrounding object 5 500-5. UI 500I also illustrates the display of a working copy 505-5 of object 5 500-5.

In some embodiments, an operation indicia is displayed in conjunction with the stack of temporarily displayed thumbnails, wherein the operation indicia to be displayed is determined by predicting one or more possible user-initiated operations based on the incomplete user gesture being currently detected. In some embodiments, the operation indicia appears as a icon corresponding to one or more smoke clouds when the user-initiated operation is a deletion operation. In some embodiments, the operation indicia appears as an animation of an icon corresponding to one or more smoke clouds when the user-initiated operation is a deletion operation, wherein the animation includes the smoke clouds rapidly dissolving after completing the deletion operation, e.g., the smoke clouds go "poof" when the stack of temporarily displayed thumbnails is deleted. In some embodiments, the prediction of what user-initiated operations may be completed is performed independently of whether a second portion of the user-gesture is detected, e.g., a user gesture performed with a single point of contact may be detected, where the user gesture is dragging a stack of temporarily displayed thumbnails towards a copy operation icon, so a copy operation indicia is displayed in conjunction with the stack of temporarily displayed thumbnails.

Figure 6A:
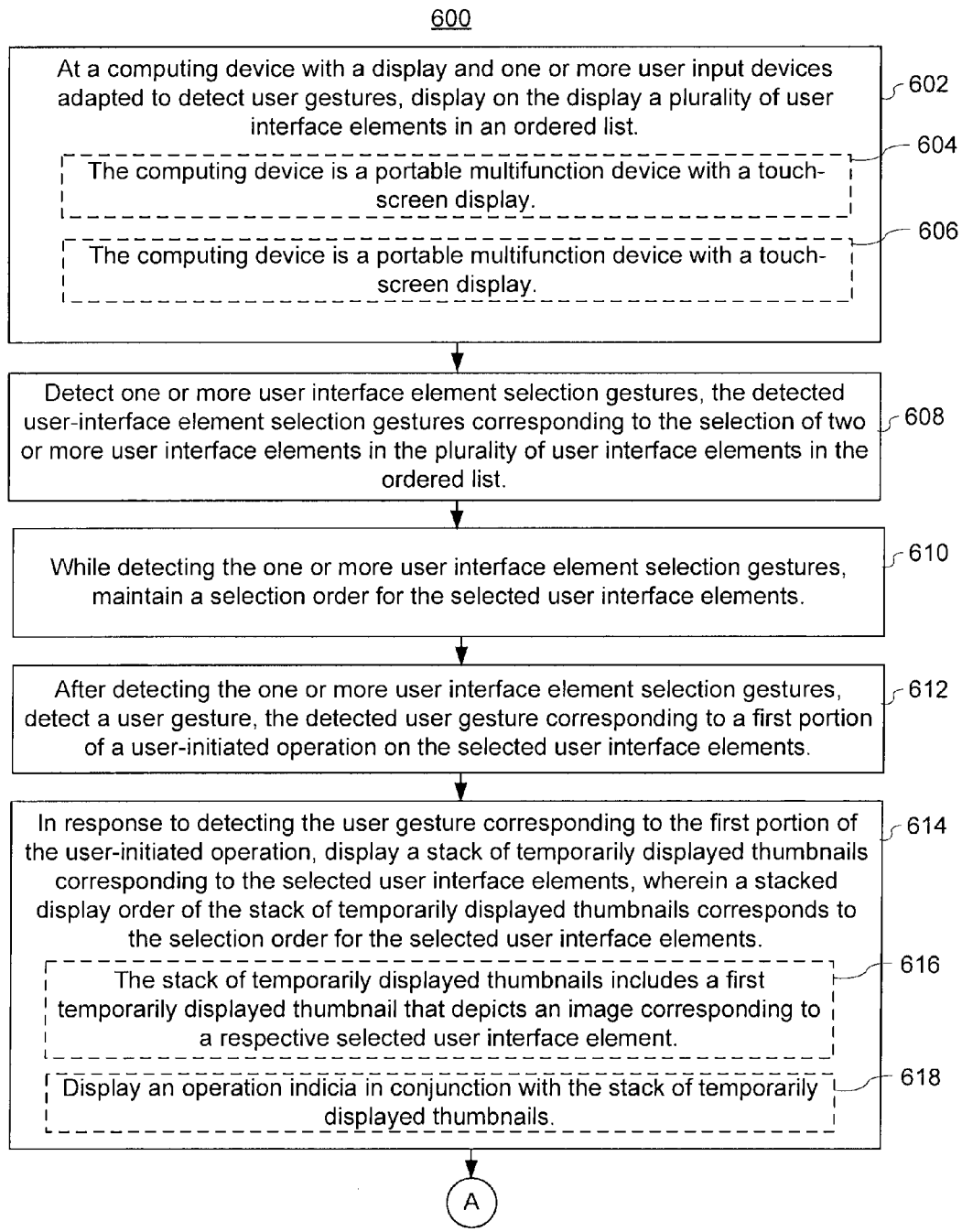

FIGS. 6A-6B are flow diagrams illustrating a method 600 of managing user interface content and user interface elements in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to manage user interface content and user interface elements. The method reduces the cognitive burden on a user when managing user interface content and user interface elements, thereby creating a more efficient human-machine interface. For battery-operated computing devices, enabling a user to manage user interface content and user interface elements faster and more efficiently conserves power and increases the time between battery charges.

Figure 5A:
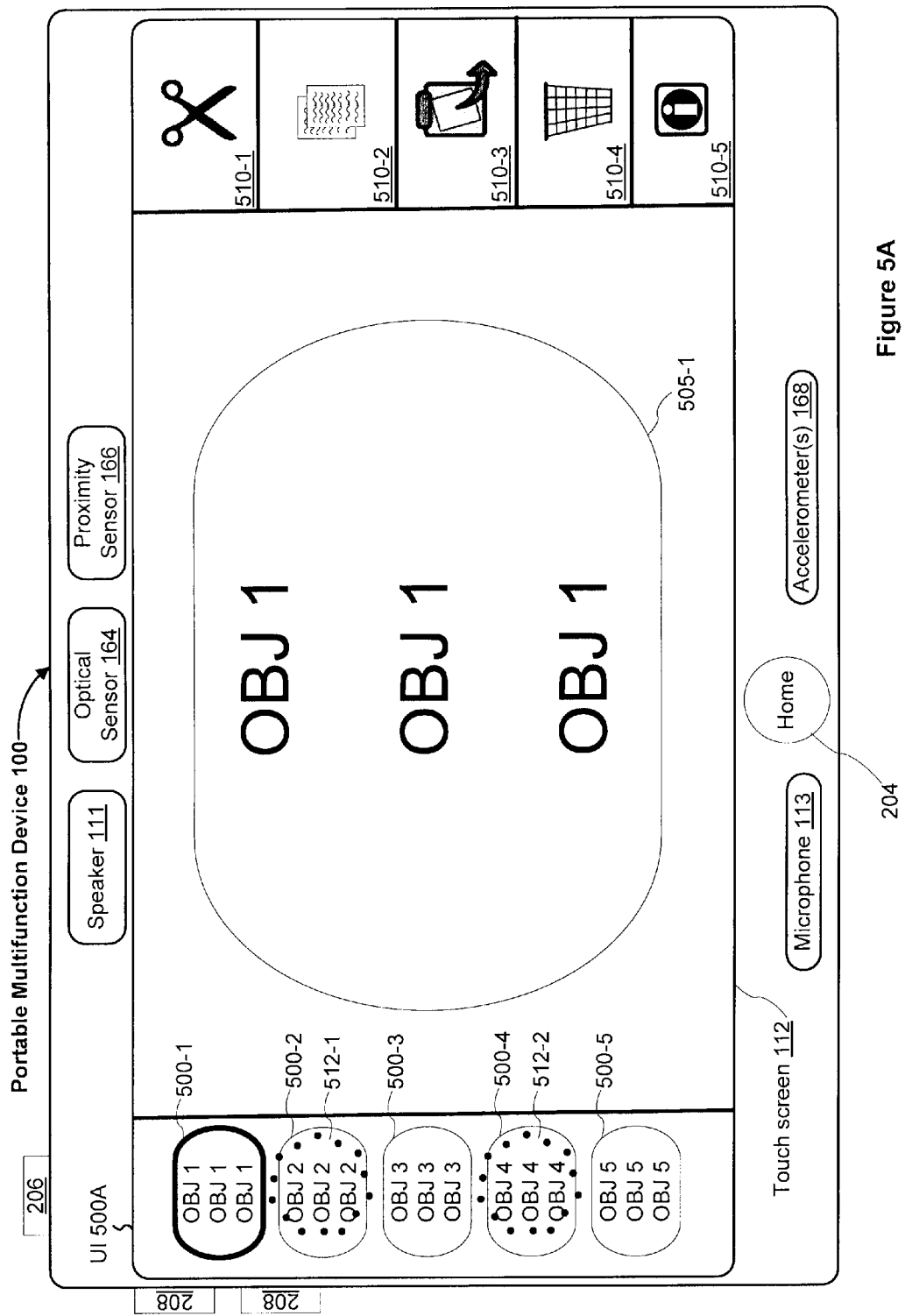
FIGS. 5A-5I illustrate exemplary user interfaces for managing user interface content and user interface elements in accordance with some embodiments.

The method is performed at a computing device with a display and one or more user input devices adapted to detect user gestures. The device displays (602) on the display a plurality of user interface elements in an ordered list (e.g., ordered list 500 is depicted in FIG. 5A, which includes a plurality of user interface elements Object 1 500-1, Object 2 500-2, Object 3 500-3, Object 4 500-4, and Object 5 500-5). User interface elements in ordered lists may include many types of user interface content within applications or content managed by an operating system or operating system shell, e.g., including without limitation, slides within a slide presentation, bulleted points in a document, rows or columns in a table or spreadsheet, visually displayed elements of a chart, displays of image or movie thumbnails, icons representing files or lists of files, pages within a document, items in an email program, calendar event blocks, virtual books on a bookshelf, elements within a task pipeline, etc. The methods described herein may be used to manage all suitable types of user interface elements.

In some embodiments, the computing device is a portable multifunction device with a touch-screen display (604) (e.g., FIG. 5A portable multifunction device 100 with touch screen 112).

In some embodiments, the one or more user input devices are selected from the group consisting of a mouse, a keyboard, a stylus, a touch-sensitive surface, and a touch-screen display (606) (e.g., FIG. 2 touch screen 112, stylus 203, FIG. 3 touchpad 355, keyboard/mouse 340, etc., or any suitable input modality).

The device detects (608) one or more user interface element selection gestures, the detected user-interface element selection gestures corresponding to the selection of two or more user interface elements in the plurality of user interface elements in the ordered list (e.g., FIG. 5A user interface element selection gestures 512-1 and 512-2, on object 2 500-2 and object 500-4, respectively, which are in ordered list 500).

Figure 5B:
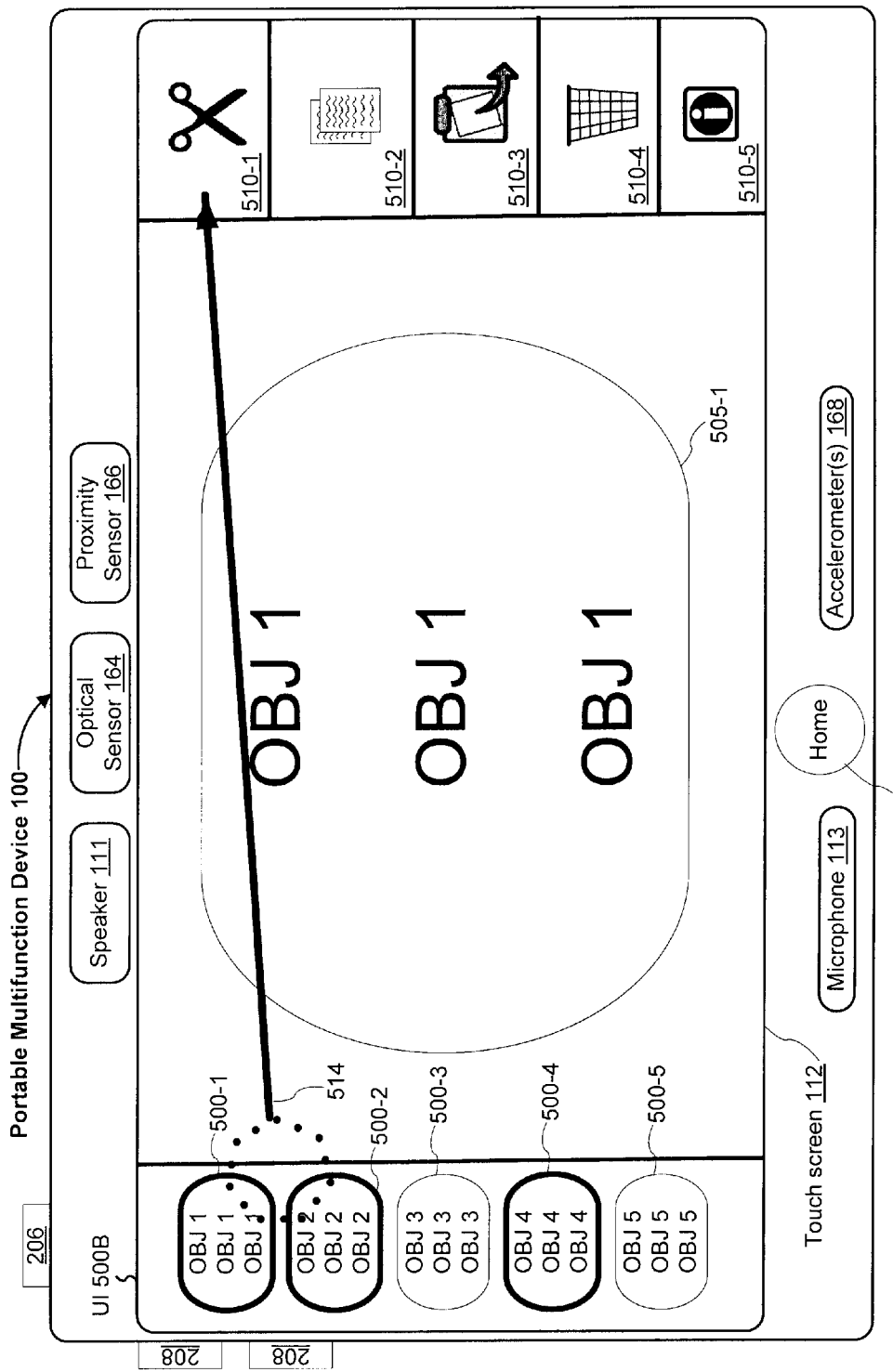

While detecting the one or more user interface element selection gestures, the device maintains (610) a selection order for the selected user interface elements (e.g., FIG. 5B, where object 1 500-1, object 2 500-2, and object 4 500-4 are selected, and the selection order is maintained).

In some embodiments, the selection order is maintained as the sequence of user selections, e.g., if user interface objects 1 through 4 are displayed and the user selects user interface objects 1, 4, and 3, in that order, but not user interface object 2, the selection order is user interface objects 1, 4, and 3.

Figure 5C:
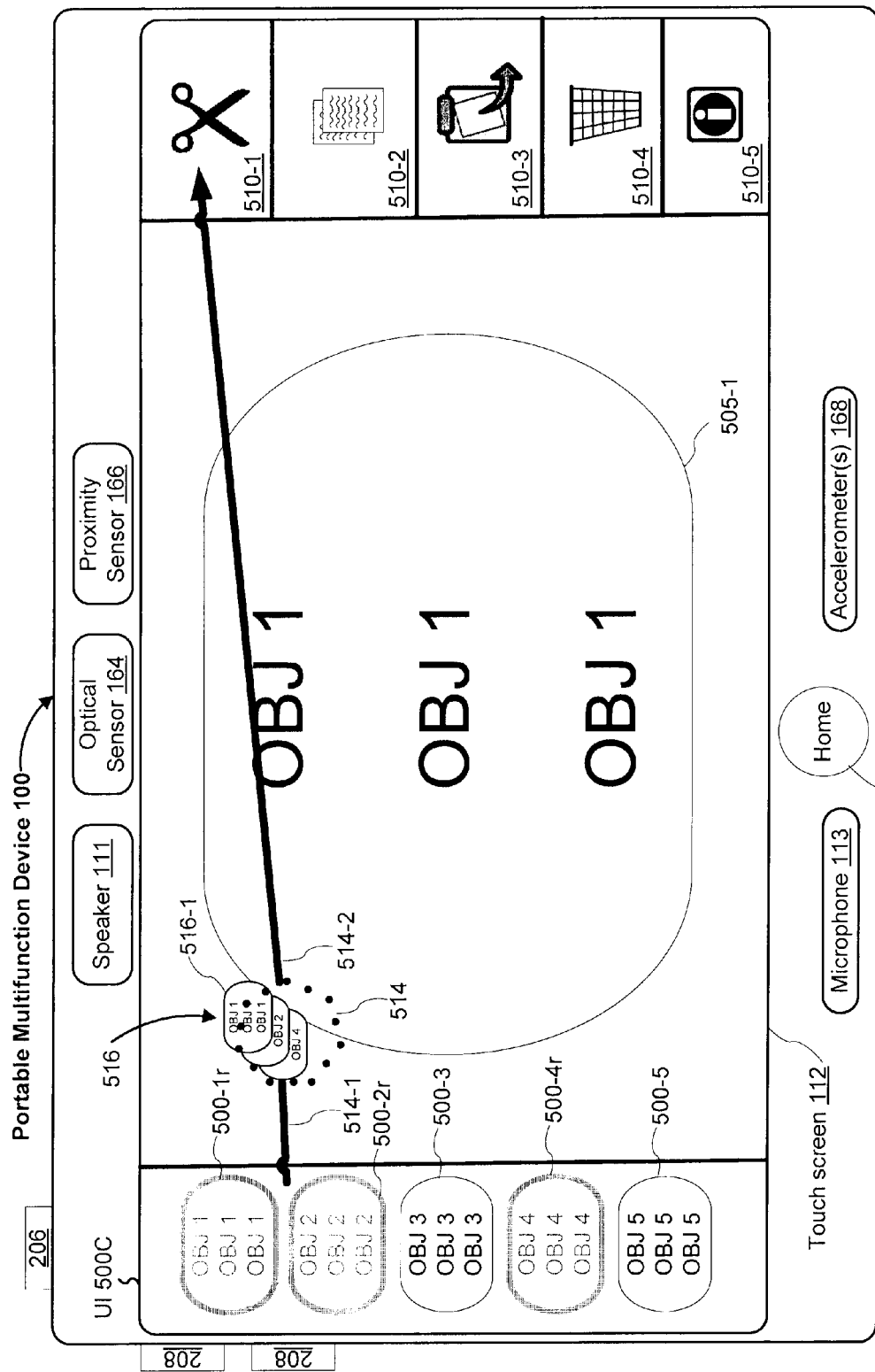
Figure 5D:
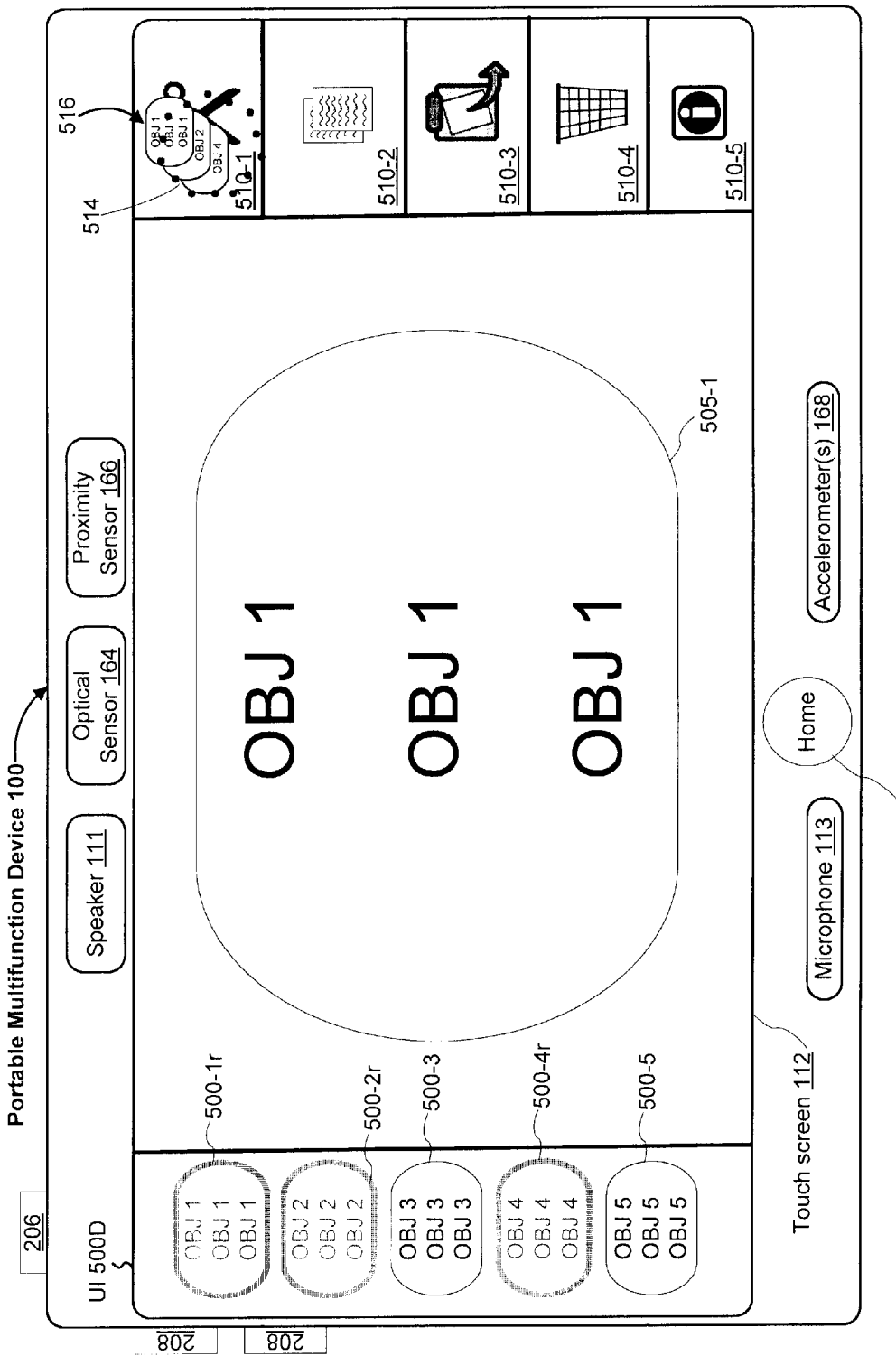
Figure 5E:
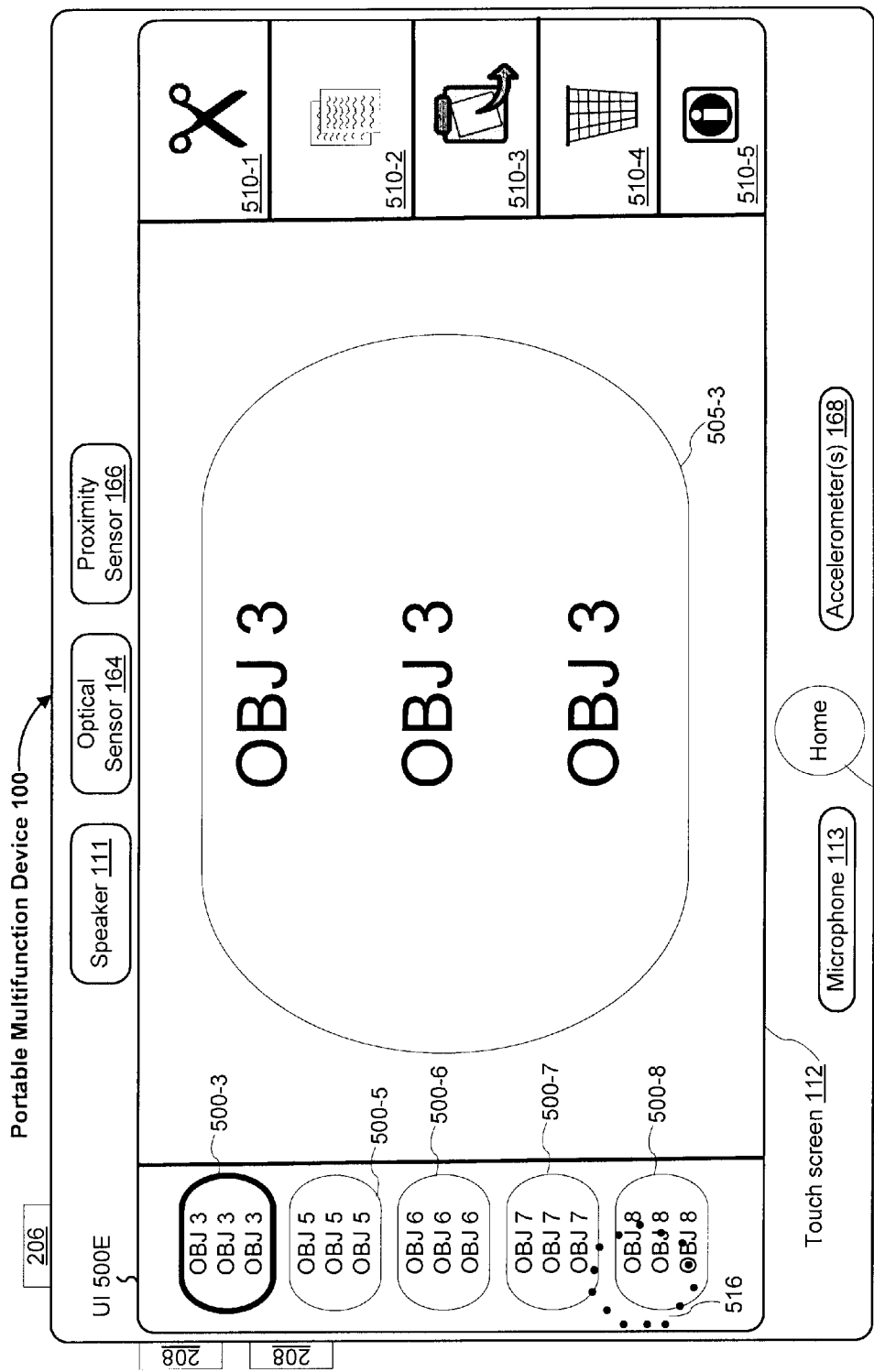
Figure 5F:
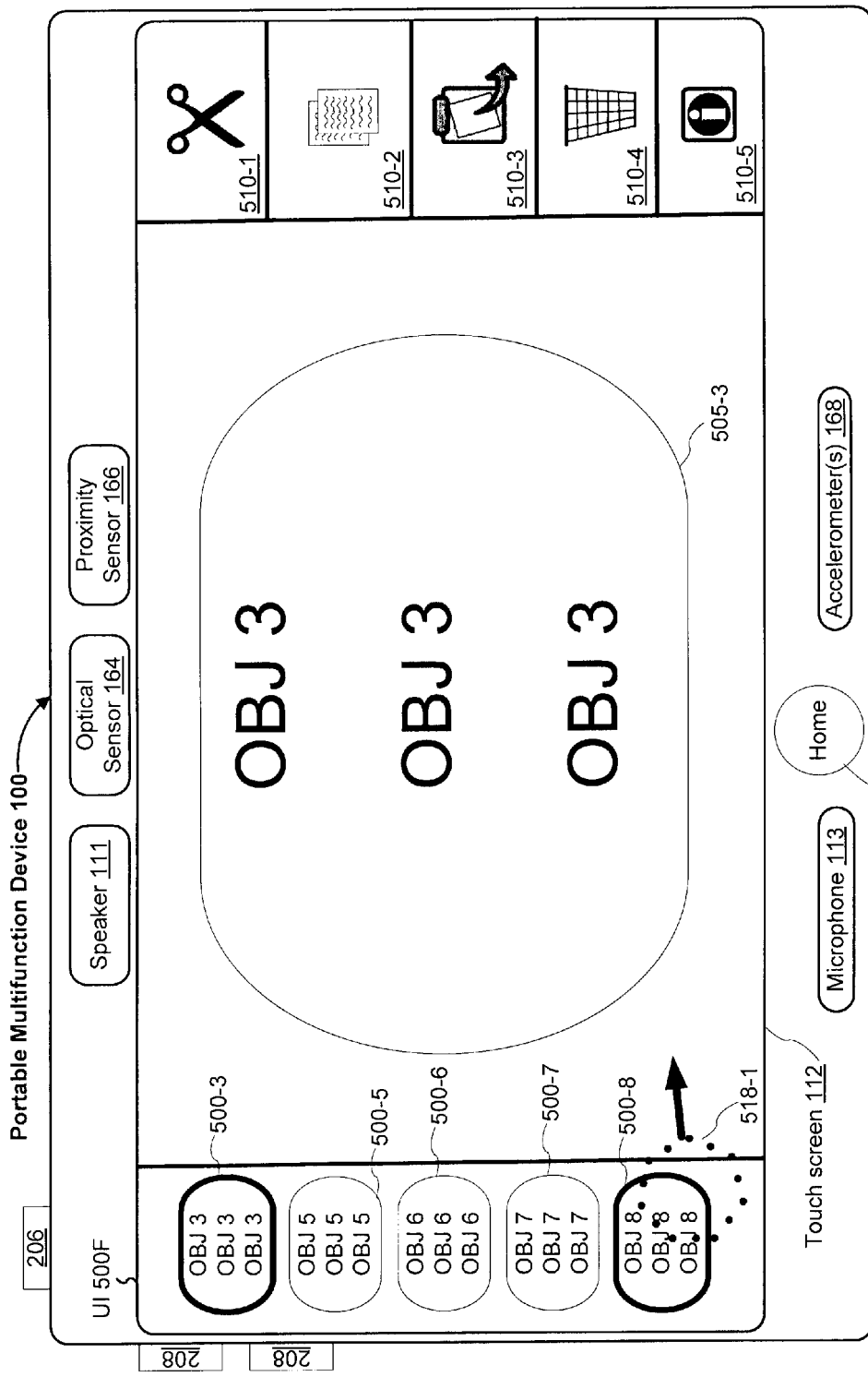

After detecting the one or more user interface element selection gestures, the device detects (612) a user gesture, the detected user gesture corresponding to a first portion of a user-initiated operation on the selected user interface elements (e.g., FIG. 5C first portion 514-1 of the user gesture 514 to initiate a user-initiated operation).

In response to detecting the user gesture corresponding to the first portion of the user-initiated operation, the device displays (614) a stack of temporarily displayed thumbnails corresponding to the selected user interface elements, wherein a stacked display order of the stack of temporarily displayed thumbnails corresponds to the selection order for the selected user interface elements (e.g., FIG. 5C stack of temporarily displayed thumbnails 516, is displayed where the order of the temporarily displayed thumbnails 516 corresponds to the selection order of the user interface elements, i.e., object 1 500-1 is above object 2 500-2, and object 2 500-2 is above object 4 500-4).

In some embodiments, the stack of temporarily displayed thumbnails includes a first temporarily displayed thumbnail that depicts an image corresponding to a respective selected user interface element (616) (e.g., FIG. 5C first temporarily displayed thumbnail 516-1 depicts an image that corresponds to selected user interface element object 500-1).

Figure 5G:
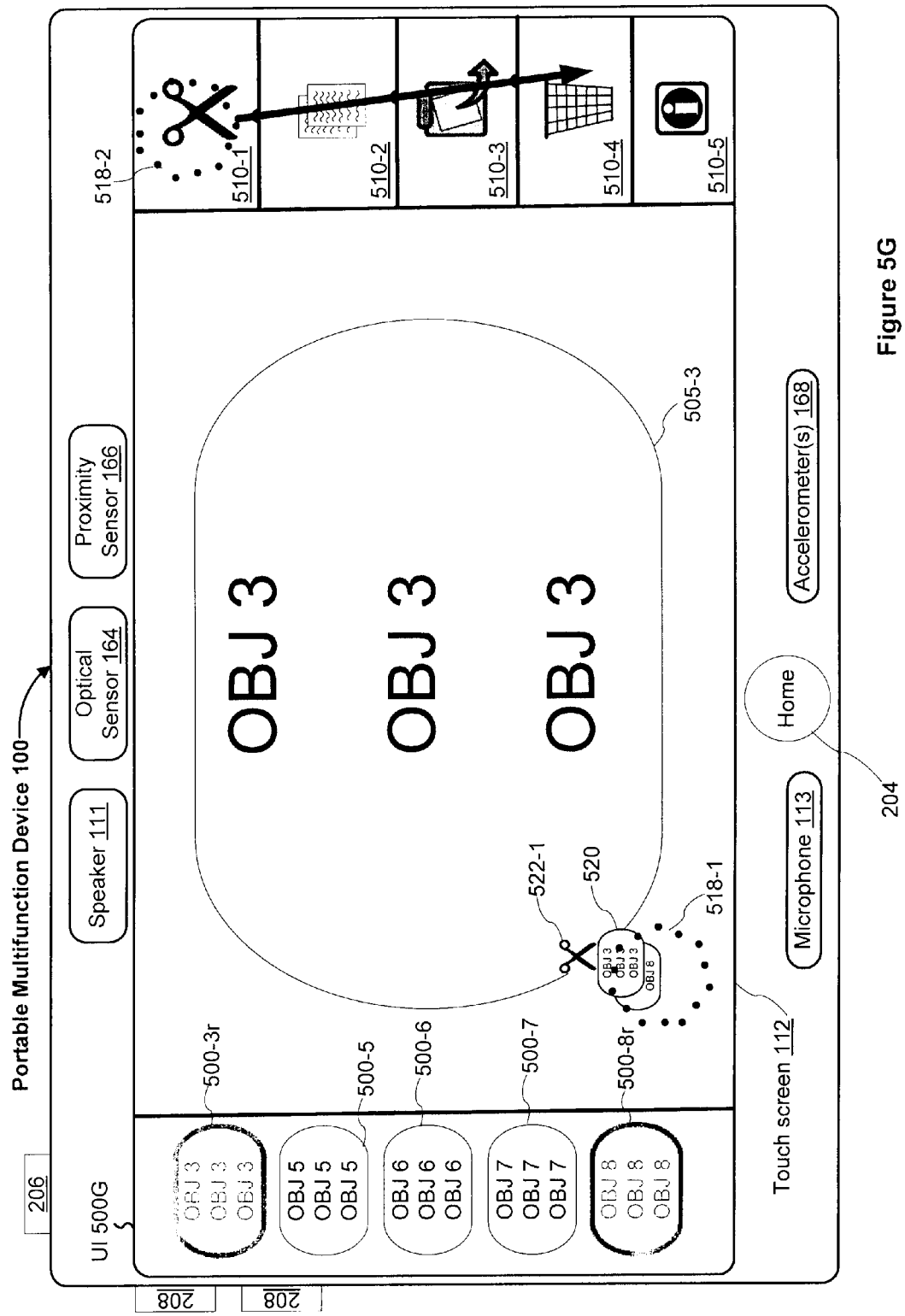
Figure 5H:
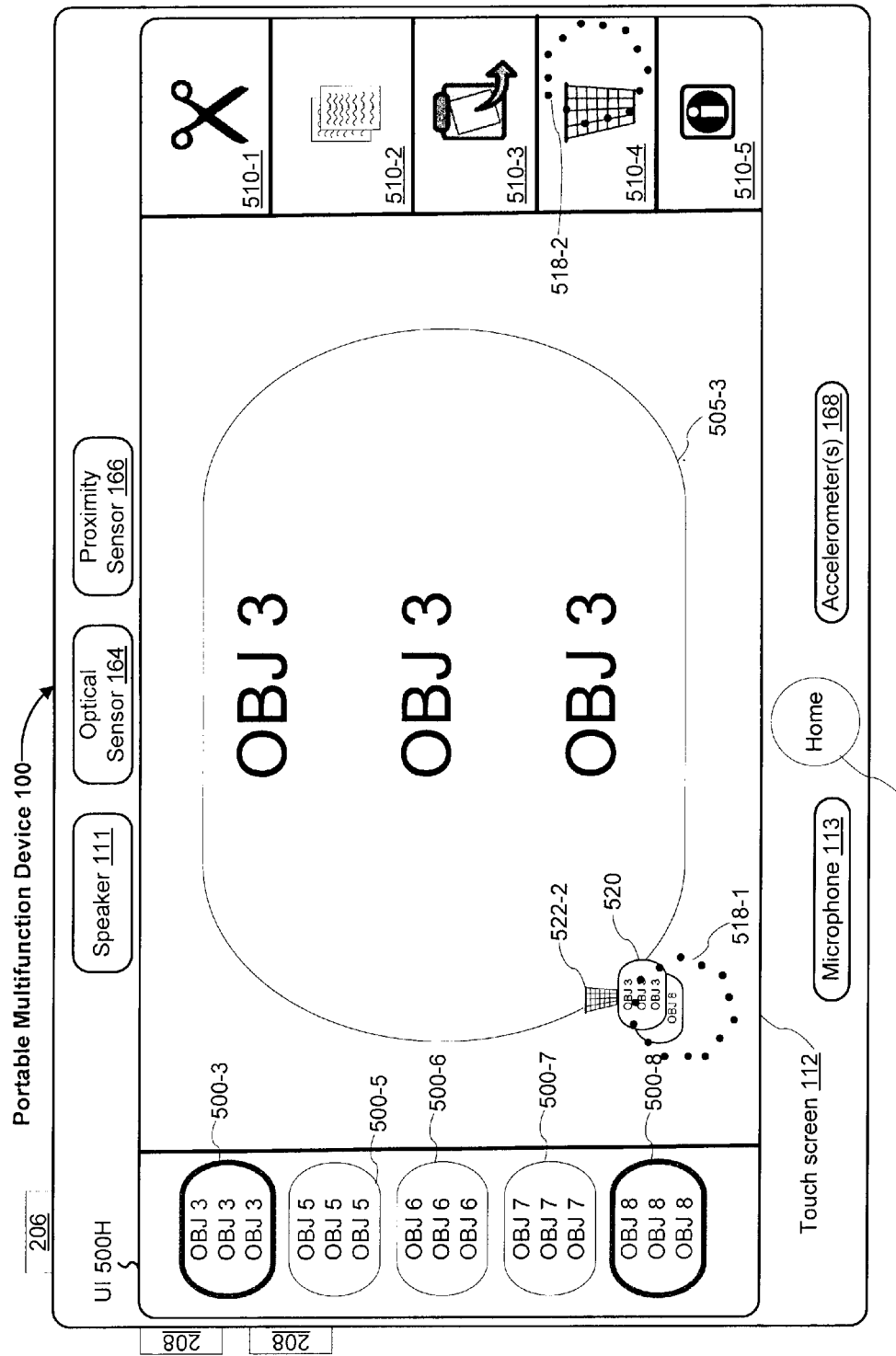
Figure 5I:
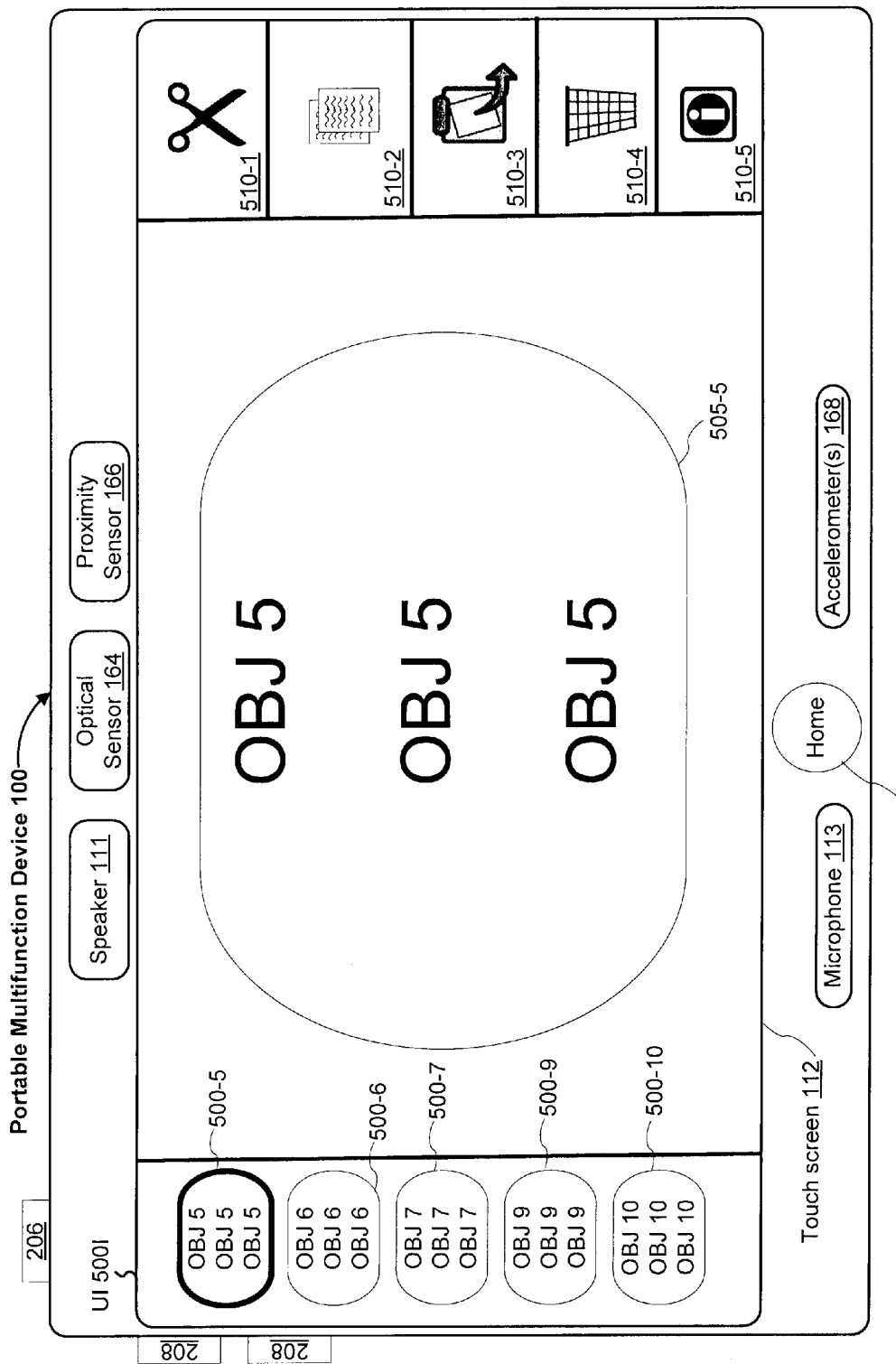

In some embodiments, the device displays an operation indicia in conjunction with the stack of temporarily displayed thumbnails (618) (e.g., FIG. 5G operation indicia 522-1 is displayed in conjunction with stack of temporarily displayed thumbnails 520).

In some embodiments, the device detects a second portion of the user-initiated operation on the selected user interface elements (e.g., FIG. 5C second portion 514-2 of user gesture 514); in response to detecting the second portion of the user-initiated operation on the selected user interface elements: the device updates the display of the stack of temporarily displayed thumbnails in accordance with the second portion of the user-initiated operation (e.g., FIG. 5C user gesture 514 is a dragging gesture on touch screen 112, which corresponds to a gesture to move the stack of temporarily displayed thumbnails 516 to cut operation 510-1); and, the device performs the user-initiated operation on the selected user interface elements (e.g., FIG. 5E object 1 500-1, object 2 500-2, and object 4 500-4 have been cut from ordered list 500 because user gesture 514 moved stack of temporarily displayed thumbnails 516 to cut operation 510-1) (620).

In some embodiments, after performing the user-initiated operation on the selected user interface elements, the device terminates display of the stack of temporarily displayed thumbnails (e.g., FIG. 5E, after object 1 500-1, object 2 500-2, and object 4 500-4 were cut from ordered list 500, display of stack of temporarily displayed thumbnails 516 is terminated) (622).

In some embodiments, the user gesture corresponding to the user-initiated operation is detected on a touch screen display; the first portion of the user gesture corresponding to the user-initiated operation is detected as a first user input; the second portion of the user gesture corresponding to the user-initiated operation is detected as a second user input; the second portion of the user gesture is detected while continuing to detect the first user input; and, the first and second user inputs are detected at different locations on the touch screen display (e.g., FIG. 5H user gesture 518 corresponding to the user-initiated operation is detected on touch screen 112; the first portion 518-1 of the user gesture 518 corresponding to the user-initiated operation is detected as a first user input; the second portion 518-2 of the user gesture corresponding to the user-initiated operation is detected as a second user input; the second portion of the user gesture is detected while continuing to detect the first user input; and, the first and second user inputs are detected at different locations on touch screen 112) (624).

In some embodiments, the selected user interface elements from the ordered list have respective pre-selection locations on the display, and in response to detecting the second portion of the user gesture, the device displays residual images of the selected user interface elements at respective pre-selection locations of the selected user interface elements (e.g., FIG. 5C selected user interface elements object 1 500-1, object 2 500-2, and object 4 500-4 are displayed as residual images object 1 500-1r, object 2 500-2r, and object 4 500-4r at their respective pre-selection locations on touch screen 112) (626).

The steps in the information processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising: at a computing device with a display and one or more user input devices adapted to detect user gestures:
   displaying on the display a plurality of user interface elements in an ordered list;
   detecting one or more user interface element selection gestures, the detected user interface element selection gestures corresponding to the selection of two or more user interface elements in the plurality of user interface elements in the ordered list;
   while detecting the one or more user interface element selection gestures, maintaining an order of selection for the selected user interface elements;
   after detecting the one or more user interface element selection gestures, detecting a user operation gesture, the detected user operation gesture corresponding to a first portion of a user-initiated operation on the selected user interface elements; and
   in response to detecting the user operation gesture corresponding to the first portion of the user-initiated operation, displaying a stack of temporarily displayed thumbnails corresponding to the selected user interface elements, wherein a stacked display order of the stack of temporarily displayed thumbnails corresponds to the order of selection for the selected user interface elements, wherein displaying the stack of temporarily displayed thumbnails includes displaying an operation indicia in conjunction with the stack of temporarily displayed thumbnails, and wherein the stack of temporarily displayed thumbnails comprise overlapping images of the selected user interface elements according to the order of selection of the selected user interface elements;
   detecting a second portion of the user-initiated operation on the selected user interface elements, wherein the selected user interface elements from the ordered list have respective pre-selection locations on the display;
   in response to detecting the second portion of the user-initiated operation on the selected user interface elements:
      updating the display of the stack of temporarily displayed thumbnails in accordance with the second portion of the user-initiated operation;
      performing the user-initiated operation on the selected user interface elements; and displaying residual images of the selected user interface elements at respective pre-selection locations of the selected user interface elements; and after performing the user-initiated operation on the selected user interface elements, terminating display of the stack of temporarily displayed thumbnails;

wherein:
the user operation gesture corresponding to the user-initiated operation is detected on a touch sensitive display;
the first portion of the user operation gesture corresponding to the user-initiated operation is detected as a first user input;
the second portion of the user operation gesture corresponding to the user-initiated operation is detected as a second user input;
the second portion of the user operation gesture is detected while continuing to detect the first user input; and,
the first and second user inputs are detected at different locations on the touch sensitive display.

2. The method of claim 1, wherein the stack of temporarily displayed thumbnails includes a first temporarily displayed thumbnail that depicts an image corresponding to a respective selected user interface element.

3. The method of claim 1, wherein the computing device is a portable multifunction device with a touch sensitive display.

4. The method of claim 1, wherein the one or more user input devices comprises a mouse, a keyboard, a stylus, a touch sensitive surface, or a touch sensitive display, or any combination thereof.

5. A computing device, comprising:
a display;
one or more processors; one or more user input devices adapted to detect user gestures;
memory; and,
one or more programs, wherein the one or more programs are stored in the memory and configured to be executed by the one or more processors, the one or more programs including instructions to:
at the computing device:
display on the display a plurality of user interface elements in an ordered list;
detect one or more user interface element selection gestures, the detected user-interface element selection gestures corresponding to the selection of two or more user interface elements in the plurality of user interface elements in the ordered list;
while detecting the one or more user interface element selection gestures, maintain an order of selection for the selected user interface elements;
after detecting the one or more user interface element selection gestures, detect a user operation gesture, the detected user operation gesture corresponding to a first portion of a user-initiated operation on the selected user interface elements; and
in response to detecting the user operation gesture corresponding to the first portion of the user-initiated operation, display a stack of temporarily displayed thumbnails corresponding to the selected user interface elements, wherein a stacked display order of the stack of temporarily displayed thumbnails corresponds to the selection order for the selected user interface elements, wherein displaying the stack of temporarily displayed thumbnails includes displaying an operation indicia in conjunction with the stack of temporarily displayed thumbnails, and wherein the stack of temporarily displayed thumbnails comprise overlapping images of the selected user interface elements according to the order of selection of the selected user interface elements;
detect a second portion of the user-initiated operation on the selected user interface elements, wherein the selected user interface elements from the ordered list have respective pre-selection locations on the display;
in response to detecting the second portion of the user-initiated operation on the selected user interface elements:
updating the display of the stack of temporarily displayed thumbnails in accordance with the second portion of the user-initiated operation;
performing the user-initiated operation on the selected user interface elements; and
displaying residual images of the selected user interface elements at respective pre-selection locations of the selected user interface elements; and
after performing the user-initiated operation on the selected user interface elements, terminating display of the stack of temporarily displayed thumbnails;

wherein:
the user operation gesture corresponding to the user-initiated operation is detected on a touch sensitive display;
the first portion of the user operation gesture corresponding to the user-initiated operation is detected as a first user input;
the second portion of the user operation gesture corresponding to the user-initiated operation is detected as a second user input;
the second portion of the user operation gesture is detected while continuing to detect the first user input; and,
the first and second user inputs are detected at different locations on the touch sensitive display.

6. The computing device of claim 5, wherein the stack of temporarily displayed thumbnails includes a first temporarily displayed thumbnail that depicts an image corresponding to a respective selected user interface element.

7. The computing device of claim 5, wherein the computing device is a portable multifunction device with a touch sensitive display.

8. The computing device of claim 5, wherein the one or more user input devices comprises a mouse, a keyboard, a stylus, a touch sensitive surface, or a touch sensitive display, or any combination thereof.

9. A method, comprising:
displaying on a touch sensitive display of an electronic device a plurality of user interface elements presented in an ordered list;
detecting a user selection gesture corresponding to a selection of one or more user interface elements of the plurality of user interface elements;
detecting a first user operation gesture corresponding to a drag of the selected one or more user interface elements;
after the first user operation gesture has been detected to have been initiated, detecting a second user operation gesture corresponding to a selection of one of a plurality of operation icons to perform an operation on the one or more user interface elements, wherein the second user operation gesture is detected substantially during ongoing detection of the first user operation gesture, and wherein the first user operation gesture and the second user operation gesture are detected at different locations on the touch sensitive display; and displaying a stack of thumbnails representing the selected one or more user interface elements during the drag of the selected user interface elements, wherein the stack of thumbnails comprises overlapping images of the selected one or more user interface elements stacked according to an order of selection of the selected one or more user interface elements, wherein displaying the stack of thumbnails comprises displaying an image of the operation icon together with the stack of thumbnails upon detection of the second user operation gesture.

10. The method of claim 9, comprising performing the operation on the selected user interface elements upon detection of the second user operation gesture, wherein performing the operation comprises performing a cut operation, a copy operation, a paste operation, a deletion operation, or any combination thereof.

* * * * *